CIRCUITS FOR REDUCING ELECTRICAL NOISE

Filed Dec. 8, 1966 3 Sheets-Sheet 1

Inventors:
ANDREW R. SASS &
ERWIN K. LOHNER
By [signature]
Attorney

Inventors:
ANDREW R. SASS &
ERWIN K. LOHNER
By Samuel Cohen
Attorney

CIRCUITS FOR REDUCING ELECTRICAL NOISE

Filed Dec. 8, 1966 3 Sheets-Sheet 3

Inventors:
ANDREW R. SASS &
ERWIN K. LOHNER
By [signature]
Attorney

United States Patent Office 3,460,101

Patented Aug. 5, 1969

3,460,101
CIRCUITS FOR REDUCING ELECTRICAL NOISE

Andrew R. Sass, Princeton, and Erwin K. Lohner, Belle Mead, N.J., assignors to RCA Corporation, a corporation of Delaware Filed Dec. 8, 1966, Ser. No. 600,202
Int. Cl. G11b 9/00
U.S. Cl. 340—173.1 10 Claims This invention relates to noise reduction and, while not restricted thereto, is particularly applicable to the reduction of "read" noise in cryoelectric memory systems.

The environment in which the present invention is useful includes a conducting element such as a superconductor ground plane, a drive lead close to the conducting element, and a sense circuit a portion of which is also close to the conducting element.

This invention relates first to the discovery that in an arrangement of the above type, when a drive signal is applied to the drive lead, a portion of said signal, manifesting itself as noise, is capacitively coupled via the conducting element to the sense circuit, and second to the provision of a circuit for the reduction of such noise. The latter, a bypass circuit, is connected between the conducting element and system ground and has an impedance, at the frequencies of the noise signal, which is a relatively small fraction of the impedance of the sense circuit to system ground. More particularly, the bypass circuit is inductively coupled to the sense circuit and exhibits an inductance which is approximately equal to the mutual inductance between the sense circuit and the bypass circuit.

The invention is discussed in greater detail below and is shown in the following drawings of which:

In the discussion which follows, a cryogenic environment for the storage elements, memory planes and certain other components is assumed. It may be achieved by immersing these components in a liquid helium bath and controlling the pressure of the surface of the bath, as is well understood in the art. For purposes of the present application, FIGURE 1 shows, by dashed line, certain of the components of this system which are in this cryogenic environment.

The circuits of the present invention are applicable to memory systems which include one or more memory planes and in which each memory plane may contain from hundreds to upwards of hundreds of thousands of memory elements. Each such memory plane includes a ground plane, many serially connected storage loops and at least one *a* and one *b* drive line. Systems of this type are discussed, for example, in copending application Ser. No. 556,664, filed June 10, 1966 by Robert A. Gange and assigned to the same assignee as the present application.

Figure 1:
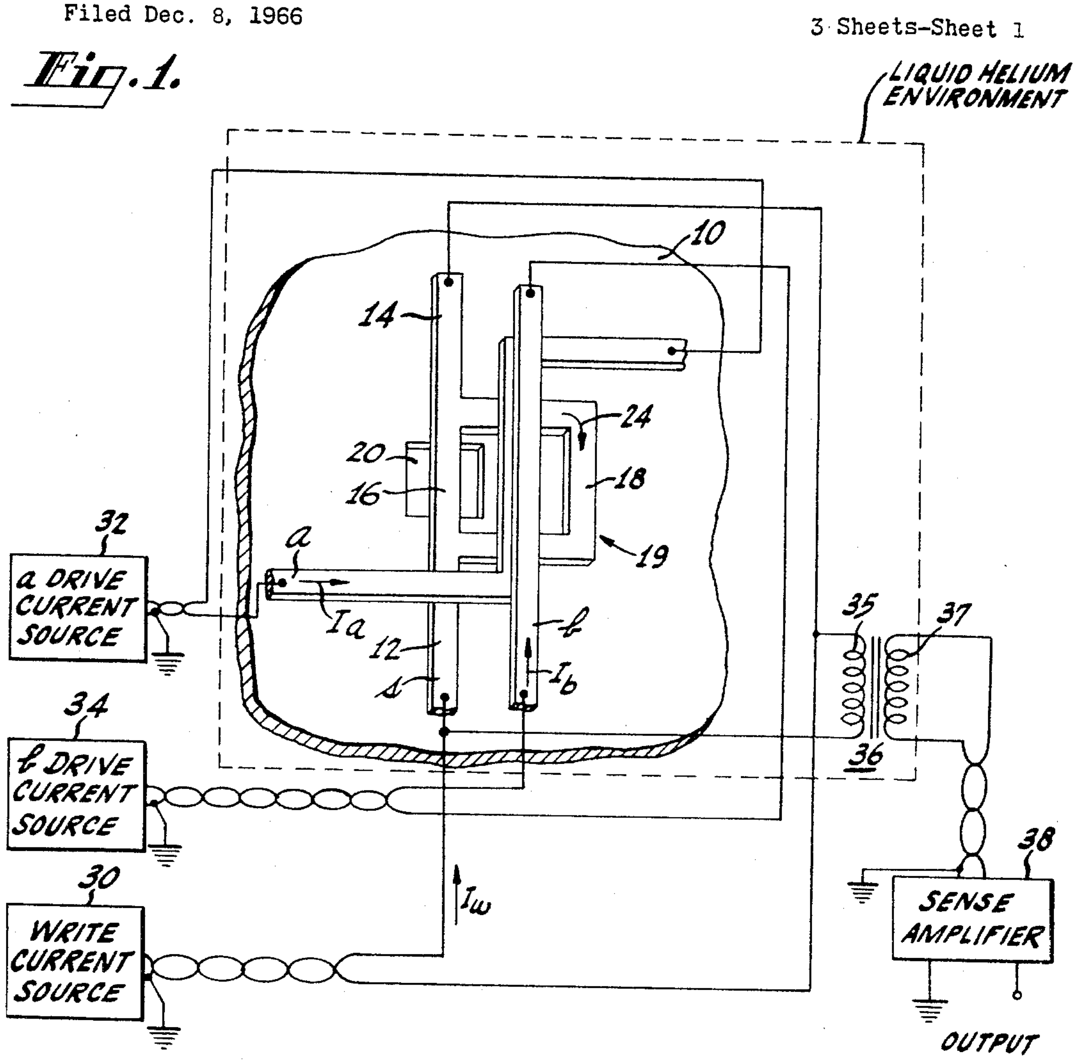
FIGURE 1 is a schematic showing of one storage element of a known cryoelectric memory system.

For purposes of the present explanation, only a single memory location is shown in FIGURE 1. The remaining storage loops, although present, need not be shown to explain the principles of operation of the invention. This memory location is located over a ground plane 10 which may be formed of a superconductor such as lead. A sense line *s*, formed of a superconductor such as tin, lies over and is insulated from the ground plane. This sense line includes an input lead 12, an output lead 14 and two parallel current paths 16 and 18 which form a storage loop 19 for persistent current. The current path 16 passes over an aperture 20 in the ground plane whereas the current path 18 does not pass over any apertures in the ground plane.

There are two drive lines *a* and *b*, formed of a superconductor such as lead, which pass over the storage loop. These two lines lie over one another in the regions where they cross the loop. They are insulated from one another, from the ground plane, from the sense line *s* and from the storage loop 19. The insulation between successive conductors may be thin-films of silicon monoxide or the like, however, for the sake of drawing clarity this insulation is not shown explicitly. The various tin and lead lines also may be in the form of thin-films.

To write information into the memory cell of FIGURE 1, write current $I_w$ is applied from the write current source 30 to the line *s* and drive currents $I_a$ and $I_b$, respectively, are applied from the *a* and *b* drive current sources 32 and 34, respectively, to the *a* and *b* lines. The write current $I_w$ divides between the paths 16 and 18 in accordance with the inductance exhibited by each path. In view of the hole 20 in the ground plane beneath path 16, it exhibits a much, much higher inductance than the path 18 and therefore substantially all of the write current initially flows into path 18.

The drive current $I_a$ and $I_b$ applied to the *a* and *b* lines, respectively, cause magnetic fields to be produced which are additive in the regions where the two lines lie over one another. The current densities are so chosen that the magnetic field which is produced is sufficient to drive portions of the path 18 of the loop to the normal (resistive) state when currents $I_a$ and $I_b$ are present at the same time but not when only one of these currents is present. When the portions of path 18 are driven normal, the write current $I_w$ decays out of path 18 and steers into the high inductance (but zero resistance) path 16.

The drive currents $I_a$ and $I_b$ are now removed while the write current $I_w$ is permitted to continue to flow. The removal of the drive currents permits the low inductance path 16 to return to the superconducting state and the flux due to the write current in path 16 becomes trapped by the loop 19. Subsequent to the return to the superconducting state of path 16, the write current $I_w$ is removed. The collapse of the trapped magnetic flux which threads loop 19 induces a current in the loop. This current is persistent due to the zero resistance of the loop and supports the flux trapped therein. This persistent current $I_p$ circulates in the loop 19 in the direction indicated by the arrow 24.

The data represented by the stored persistent current (or the absence of the persistent current) may be read out of the loop by applying read currents to the *a* and *b* drive lines in the absence of write current $I_w$ in the sense line. The two read currents drive the two portions of the path 18 normal again at the regions beneath the *a* and *b* lines. If the loop is storing a persistent current (this is indicative of the storage of a binary digit of given value, such as a 1) this current is caused to die out when a portion of the storage loop is driven normal and, in the process, a voltage develops across the loop which may be detected as a sense voltage across the outer terminals of the sense line *s*. If no persistent current is present (this is indicative of the storage of a bit of the other binary value, such as a 0) no sense voltage develops when the path 18 is driven normal.

The sense voltage, if one is present, is applied to the primary winding 35 of transformer 36. This results in a voltage at the secondary winding 37 and this voltage is applied to sense amplifier 38.

In a cryoelectric memory of the type discussed above, the sense signal amplitude is relatively low. It is therefore important to reduce any noise which is present to a minimum value so that the signal-to-noise ratio will be sufficiently high that the sense signal can be detected. One source of noise is the "half-select" noise which is due to read currents. It has been discovered that the way in which this noise develops is as shown in FIGURE 2.

Each drive line *a* and *b* lies very close to the ground plane over a relatively long portion of its length. Therefore, each such line is capacitively coupled to the ground plane 10. This is illustrated for the *a* drive line in FIGURE 2 by the capacitors 40 and 42, shown in phantom view. These capacitors and the other ones shown in phantom view represent, of course, distributed capacitance. In a similar manner, the sense line *s* is capacitively coupled to the ground plane by distributed capacitors 44 and 46. (For purposes of FIGURE 2 and the remaining figures, the various storage loops which are present along line *s* are not illustrated. Neither is the *b* drive line in a number of the figures.)

As is apparent in FIGURE 1, the ground plane is located in a liquid helium bath whereas the drive current source 32 and the sense amplifier 38 are located in a room temperature environment. Since the ground plane is physically spaced a substantial distance from the *a* current drive source 32, for example, it is difficult (actually it has been found, in practice, to be impossible) to place the ground plane at the same alternating current potential as system ground.

Figure 2:
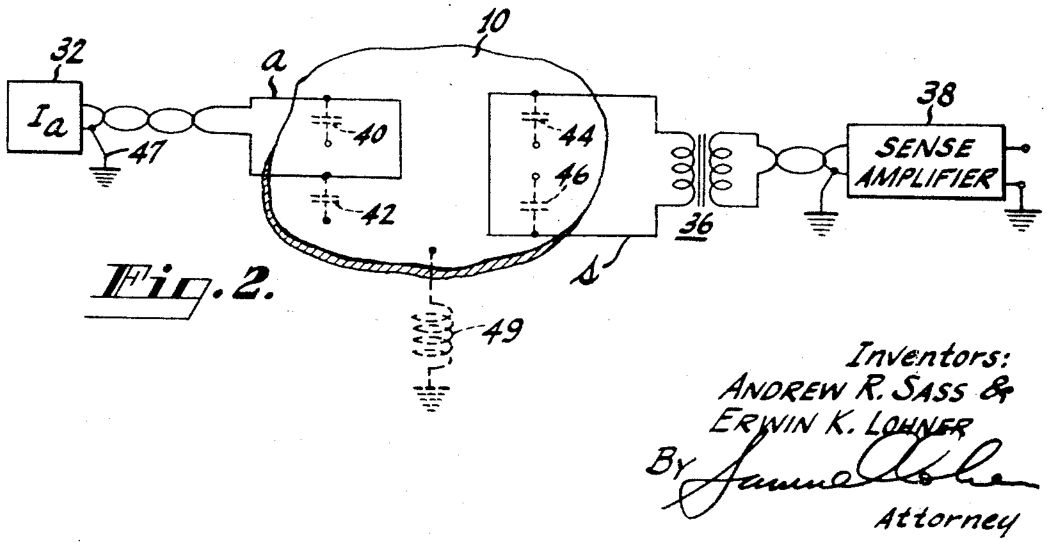
FIGURE 2 is an equivalent circuit to explain one source of noise in the system of FIGURE 1.

System ground is illustrated in the figures by the conventional ground symbol such as 47 of FIGURE 2. If one attempts to place the ground plane 10 at system ground by connecting a wire between the ground plane and system ground, this wire acts like an inductor (shown in phantom view at 49 in FIGURE 2). Moreover, because of the length of the wire, this inductor has a relatively large value (about 200 or more nanohenries) and exhibits a substantial inductive reactance to the frequency components (2 megacycles and higher) of the noise. When charge accumulated on the ground plane causes current flow through this inductor 49, a voltage develops which maintains the ground plane at a potential different from that at system ground.

In view of the above, when a read current is applied, for example, to one of the read lines passing over a memory location, but not to the other, although the memory location is not selected (that is, if the path 18 of FIGURE 1 is not driven normal) a portion of the read current is capacitively coupled to the ground plane. From the ground plane the charge which accumulates on the ground plane has a number of parallel paths by which it may return current to system ground. Unfortunately, one of these paths is via distributed capacitors 44 and 46 and the transformer 36 to the sense amplifier 38. It has been discovered that a relatively large portion of the current does, in fact, flow in this path and it manifests itself as noise of amplitude so great that it essentially swamps out any sense signal which may be present.

Figure 3:
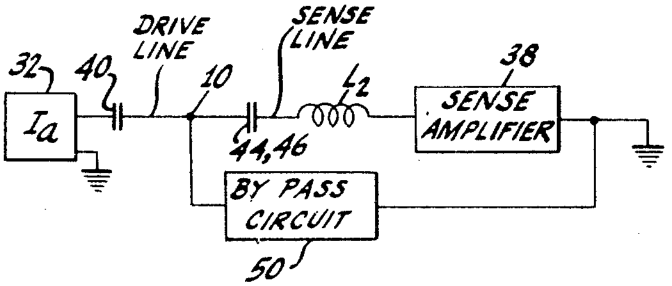
FIGURES 3 and 4 are equivalent circuits to explain the operation of the arrangement of the present invention.

The invention, in it most general terms, is illustrated in FIGURE 3. In this figure the distributed capacitance is shown by solid lines. The same reference numerals are employed as in the previous figures. Note that common circuit point 10 represents the ground plane. Note also that the inductor of value $L_2$ represents the distributed inductance of the entire sense circuit looking from the ground plane through the sense amplifier to system ground.

According to the invention, a bypass circuit 50 is connected between the ground plane and system ground. This bypass circuit has an impedance which is only a small fraction of that of the sense line at the frequencies of the self-select noise signals, that is, at frequencies greater than about 2 megacycles. Moreover, as will be shown in more detail below, this bypass circuit is so arranged that it does not bypass any legitimate sense signal which may be present.

Figure 4:
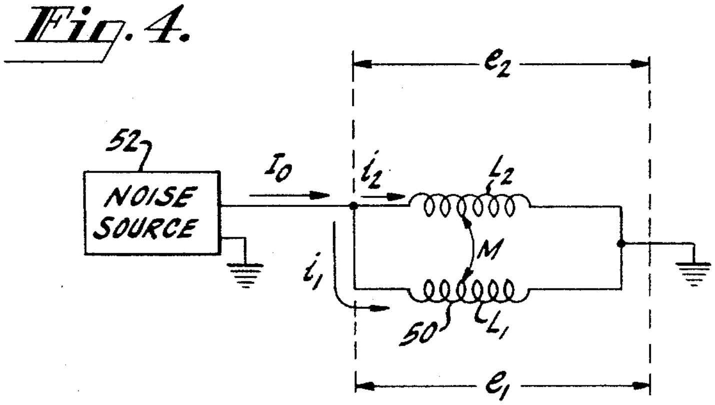

The inventors have discovered that the bypass circuit of FIGURE 3 does have the desired characteristics if it is inductively coupled to the sense circuit and if its distributed inductance $L_1$ is equal to the mutual inductance M between the bypass circuit and the sense circuit. All of this is shown in schematic form in FIGURE 4. The noise source 52 includes the ground plane and the read current sources capacitively coupled thereto.

The following equations show that when $L_1=M$ then substantially all of the noise current generated at 52 flows into path 50. The meanings of the various terms in the equations should be self-evident from FIGURE 4.

$$e_1=L_1\frac{di_1}{dt}+M\frac{di_2}{dt} \quad (1)$$

$$e_2=L_2\frac{di_2}{dt}+M\frac{di_1}{dt} \quad (2)$$

$$e_1=e_2 \text{ (by inspection)} \quad (3)$$

$$I_0=i_1+i_2 \quad (4)$$

$$e_1=L_1\frac{di_1}{dt}+M\frac{dI_0}{dt}-M\frac{di_1}{dt} \quad (5)$$

$$e_2=L_2\frac{dI_0}{dt}-L_2\frac{di_1}{dt}+M\frac{di_1}{dt} \quad (6)$$

Combining (5) and (6) gives:

$$(L_1-M)\frac{di_1}{dt}+M\frac{dI_0}{dt}=(M-L_2)\frac{di_1}{di}+L_2\frac{dI_0}{dt} \quad (7)$$

Combining terms and simplifying gives:

$$(L_1+L_2-2M)\frac{di_1}{dt}=(L_2-M)\frac{dI_0}{dt}$$

$$\frac{di_1}{dt}=\left[\frac{L_2-M}{L_1+L_2-2M}\right]\frac{dI_0}{dt} \quad (8)$$

Substituting $M=L_1$ into (8) and then simplifying gives:

$$\frac{di_1}{dt}=\left[\frac{L_2-L_1}{L_1+L_2-2L_1}\right]\frac{dI_0}{dt}$$

$$\frac{di_1}{dt}=\frac{dI_0}{dt} \quad (9)$$

Therefore:

$$i_1=I_0 \quad (10)$$

It is found that a coaxial line does have the characteristics discussed above, that is, the mutual inductance between its inner and outer conductors is equal to the inductance of the outer conductor. This holds regardless of the position of the inner conductor. Therefore, if path 50 is made to be the outer conductor of a coaxial line and is connected to system ground, the half-select noise capacitively coupled to the ground plane will be bypassed to system ground.

Figure 5:
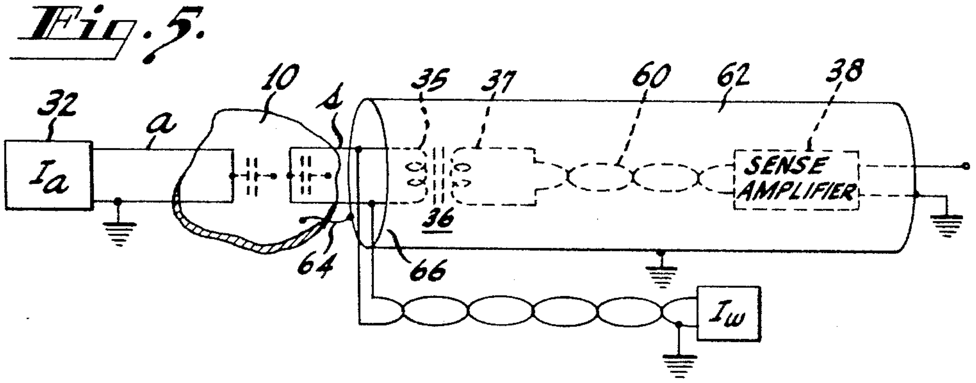
FIGURE 5 is a schematic circuit diagram of a simplified form of the system of the present invention.

The principles above are made use of in the present invention by arranging the system as shown in FIGURE 5. The current path, consisting of the pulse transformer 36, the twisted pair 60 and the sense amplifier 38, is located within a coaxial shield 62. This shield 62 is directly connected via a relatively short length of wire 64 to the ground plane 10. The ground plane 10 and the transformer 36 are located in a liquid helium bath and the shield 62 preferably extends from the helium bath where it encloses the pulse transformer, through the neck of the Dewar flask (not shown) which contains the liquid helium, to the sense amplifier which is in a room temperature environment.

In a half-select situation, the noise coupled to the ground plane flows almost entirely through wire 64 and the conducting sheath 62 to system ground. Essentially none of this noise passes to the sense amplifier via the sense lead *s*. However, when a memory location is driven normal, a voltage does develop across the primary winding 35 of the sense amplifier in the manner already discussed and is applied via the secondary winding 37 and twisted pair 60 to the sense amplifier. Under this set of conditions, the bypass circuit 64, 62 has substantially no effect, as should be clear from the figure and from the discussion of FIGURE 1.

Figure 6:
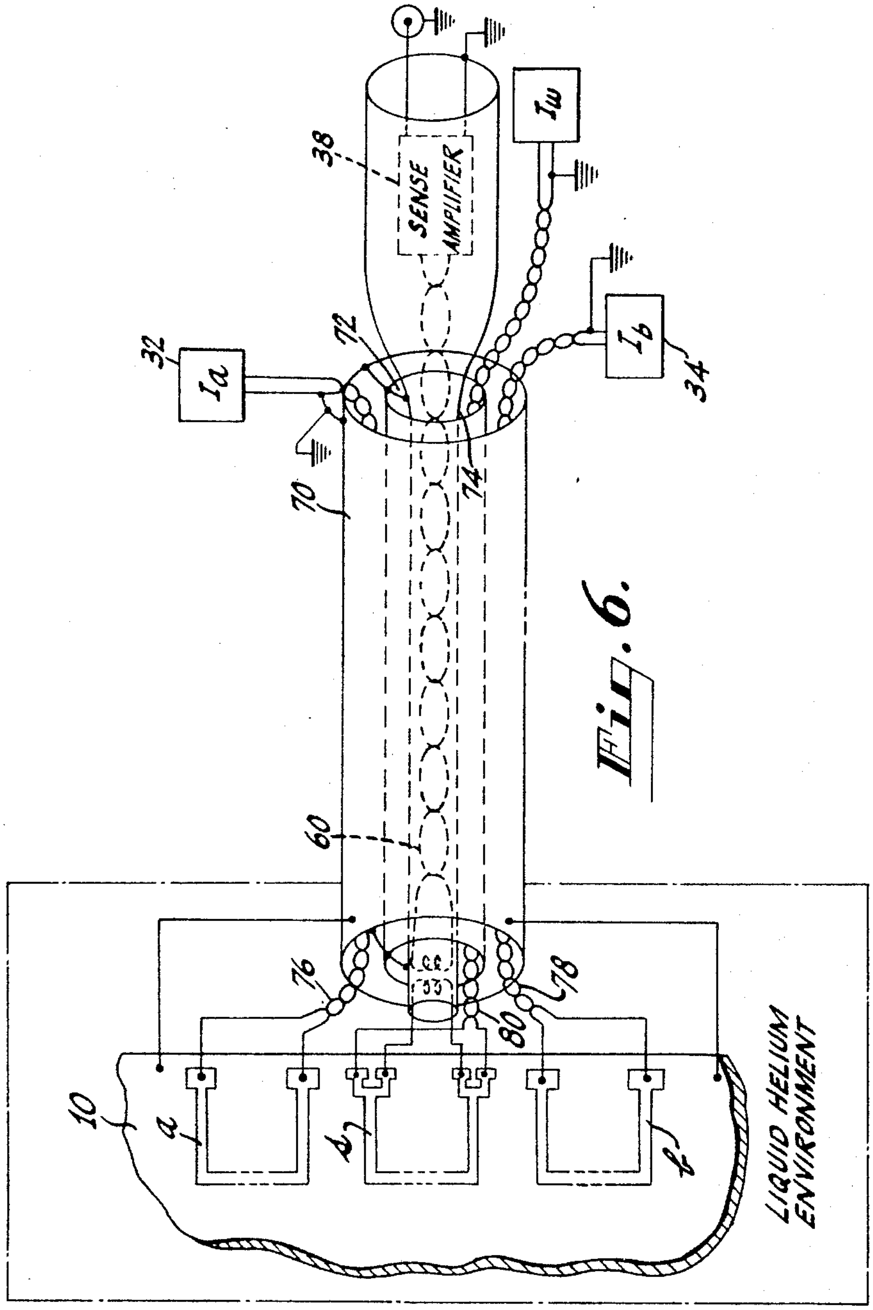
FIGURE 6 is a schematic circuit diagram of another form of the present invention.

The principles of the invention are also incorporated in the system of FIGURE 6. Here there is an inner conductor consisting of the twisted pair 60 and three coaxial sheaths 70, 72 and 74 located around the inner conductor. The twisted pair 76, going to the *a* drive line, is located between sheaths 70 and 72; the twisted pair 78 for the *b* drive line is similarly located; the twisted pair 80 which carries the write current to the *s* line is located between sheaths 72 and 74. The three sheaths 70, 72 and 74 are connected together at both ends thereof and in turn are all connected to system ground.

The operation of the arrangement of FIGURE 6 is quite similar to that of the arrangement of FIGURE 5. However, in addition to the single bypass circuit of FIGURE 5, two additional bypass circuits 70 and 72 are provided. These bypass any residual noise signal which may be present, for example, at twisted pair 60 to, for example, sheaths 72 and 70 and thence to system ground. In addition to all this, the sheaths 70, 72 and 74 also lessen the tendency for the drive current or write current present in any of the twisted pairs to directly couple into the twisted pair leading to the sense amplifier. Note that as in the arrangement of FIGURE 5, it is preferred that the conductor 74 (or 70 or 72) extend into the helium and around the pulse transformer at one end, and that it shield the sense amplifier 38 at its opposite end.

What is claimed is:

1. In a system including a conducting element at a potential other than system ground; a drive lead capacitively coupled to said element and one terminal of which is at system ground; and a sense circuit also capacitively coupled to said conducting element and one terminal of which is at system ground, whereby when a drive signal is applied to said drive lead a portion of said signal, manifesting itself as noise, tends to be capacitively coupled via said conducting element to said sense circuit; an arrangement for substantially reducing the amount of said noise applied to said sense circuit comprising: a bypass circuit connected between said conducting element and system ground and having an impedance between said conducting element and system ground which is a relatively small fraction of the impedance of said sense circuit to system ground.

2. In an arrangement as set forth in claim 1, said bypass circuit being inductively coupled to said sense circuit and having a valve of inductance which is essentially equal to the mutual inductance between said bypass circuit and said sense circuit.

3. In an arrangement as set forth in claim 2, said bypass circuit comprising a conductive shield about said sense circuit.

4. In an arrangement as set forth in claim 1, the connection between the conducting element and bypass circuit comprising a direct current connection.

5. In a system including a memory having a superconducting ground plane located in a cryogenic environment; a drive lead insulated from but capacitively coupled to said ground plane and one terminal of which is at system ground; and a sense circuit including a sense lead in said cryogenic environment capacitively coupled to said ground plane and having a pair of output terminals, a sense amplifier in a room temperature environment providing a return path to system ground, said amplifier having a pair of input terminals, and a circuit connecting the sense lead output terminals to the input terminals of said sense amplifier, whereby when a drive signal is applied to said drive lead, a portion of said signal, manifesting itself as noise, tends to be capacitively coupled via said ground plane through said sense amplifier to system ground: an arrangement for substantially reducing the amount of said noise coupled to said sense amplifier comprising a bypass circuit connected between said ground plane and system ground and having an impedance between said ground plane and system ground which is relatively small fraction of the impedance through said sense circuit to system ground.

6. In a system as set forth in claim 5, said bypass circuit comprising a conductive shield about both said circuit connecting the sense lead to said two terminals of said sense amplifier, and said sense amplifier.

7. In a system as set forth in claim 5, said bypass circuit comprising a conductor inductively coupled to said sense circuit and exhibiting an inductance which is equal to the mutual inductance between it and said sense circuit.

8. A cryoelectric memory system comprising, in combination:

(A) a superconducting ground plane located in a cryogenic environment;

(B) drive means located on but insulated from said ground plane and one terminal of which is at system ground;

(C) a storage and sense circuit including:

(a) at least a persistent current storage means in said cryogenic environment coupled to said drive means, located on but insulated from said ground plane, and having a pair of output terminals, (b) a sense amplifier in a room temperature environment providing a return path to system ground, said amplifier having a pair of input terminals, and (c) a circuit connecting the storage means output terminals to the input terminals of said sense amplifier, whereby when a portion of the storage loop is driven normal, a sense signal is applied from the storage loop to the sense amplifier if the loop is storing a persistent current, or when a drive signal is applied to said drive means which does not drive the storage loop normal, a portion of said signal, manifesting itself as noise, tends to be capacitively coupled via said ground plane through said sense amplifier to system ground; and (d) an arrangement for substantially reducing said noise without substantially affecting the sense signal comprising a bypass circuit connected between said ground plane and system ground and having an impedance between said ground plane and system ground which is relatively small fraction of the impedance through said sense circuit to system ground.

9. A cryoelectric memory system as set forth in claim 8, wherein said circuit connecting the storage means output terminals to the input terminals of said sense amplifier comprise a pulse transformer located in said cryogenic environment and a twisted pair connected between the pulse transformer and said sense amplifier.

10. A cryoelectric memory system as set forth in claim 9, wherein the arrangement for substantially reducing said noise comprises a conductive shield which extends from said cryogenic environment to said room temperature environment and which encloses said pulse transformer, twisted pair and sense amplifier, said conductive shield being connected at one end to said superconducting ground plane and being also connected to system ground.

References Cited

UNITED STATES PATENTS

| | | | |
|---|---|---|---|
| 2,966,647 | 12/1960 | Lentz | 340—173.1 |
| 3,172,084 | 3/1965 | Alphonse | 340—173.1 |
| 3,372,384 | 3/1968 | Ahrons et al. | 340—173.1 |

BERNARD KONICK, Primary Examiner

J. F. BREIMAYER, Assistant Examiner